United States Patent [19]

Wakayama et al.

[11] 4,228,355

[45] Oct. 14, 1980

[54] METHOD FOR SHORTENING RESPONSE TIME OF LOGARITHMIC MEASURING APPARATUS

[75] Inventors: Naoaki Wakayama, Ibaraki; Toshiyuki Iida, Wakayama; Hideshi Yamagishi, Mito, all of Japan

[73] Assignee: Japan Atomic Energy Research Institute, Tokyo, Japan

[21] Appl. No.: 870,530

[22] Filed: Jan. 18, 1978

[30] Foreign Application Priority Data

Jan. 19, 1977 [JP] Japan ................................. 52/3994

[51] Int. Cl.² .......................... H01J 39/28; G06G 7/12
[52] U.S. Cl. ................................. 250/374; 307/230
[58] Field of Search .................. 250/374, 275, 288; 328/145, 162; 324/132; 307/230

[56] References Cited

U.S. PATENT DOCUMENTS

| | | | |
|---|---|---|---|
| 2,818,504 | 12/1957 | De Shong, Jr. | 250/374 |
| 3,448,289 | 6/1969 | Harris | 307/230 |

OTHER PUBLICATIONS

K. Fränz et al., "The Stabilization of Pulse Amplitudes in Amplifiers with Negative Feedback", Nuclear Instruments and Methods, vol. 27, pp. 125-128, 1964.

G. C. Willems, "Network Table for Easier Control-System Design", Electronic Design, vol. 11, #17, Aug. 16, 1963.

Primary Examiner—Alfred E. Smith
Assistant Examiner—Carolyn E. Fields
Attorney, Agent, or Firm—Oblon, Fisher, Spivak, McClelland & Maier

[57] ABSTRACT

A resistor of a specific resistance value is inserted between a signal line for transmitting ionization chamber current and a logarithmic amplifier. The specific resistance value is selected to be a proper value so that the value of a negative feedback capacitance of the logarithmic amplifier can be made zero or extremely small without instability phenomena such as an overshoot, ringing or oscillation. Accordingly, it is possible that the response time of a logarithmic measuring apparatus is extremely reduced in a small input-current region.

1 Claim, 7 Drawing Figures

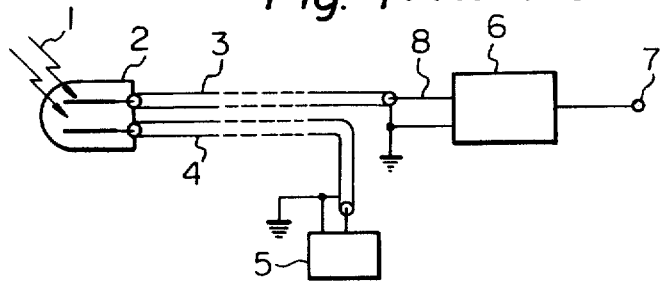
Fig. 1 Prior Art
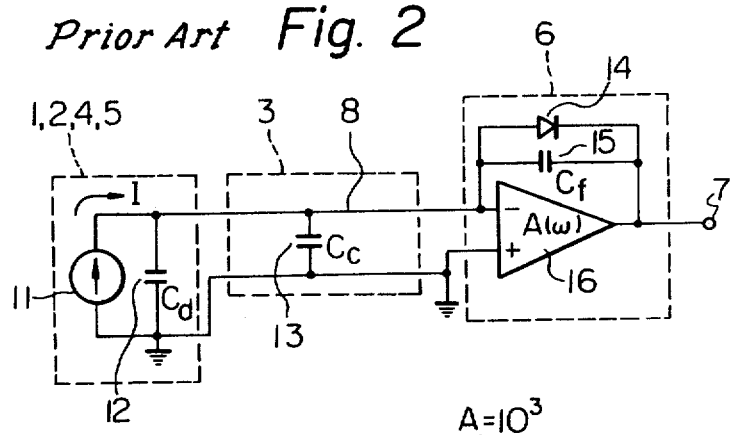
Prior Art Fig. 2
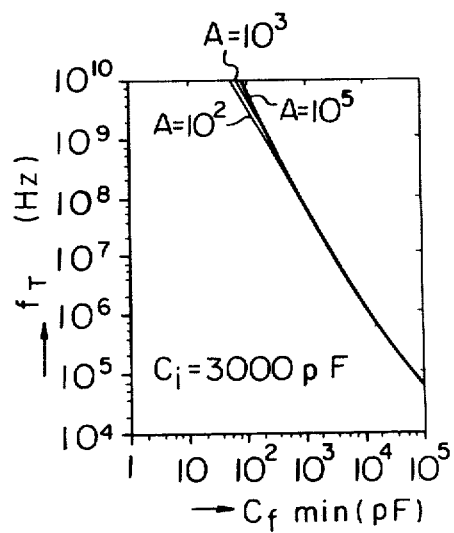
Fig. 3

(a) $f_T = 1$ MHz IN THE PRIOR ART
(b) $f_T = 10$ MHz IN THE PRIOR ART
(c) $f_T = 1$ MHz IN THE PRESENT INVENTION
(d) $f_T = 10$ MHz IN THE PRESENT INVENTION

METHOD FOR SHORTENING RESPONSE TIME OF LOGARITHMIC MEASURING APPARATUS

BACKGROUND OF THE INVENTION

1. Field of the Invention

This invention relates to a method for shortening response time of a logarithmic measuring apparatus to be used in the field of instrumentation of the nuclear reactors, critical assemblies and particle accelerators. More particularly, a method to reduce response time of a logarithmic measuring apparatus in which when the input signal into a logarithmic amplifier is current signal and when an electrostatic capacitance of some measure to ground, that cannot be disregarded, exists in a signal source and/or a signal line that connects the signal source to the logarithmic amplifier, a resistor of a specific resistance value is inserted between the signal source or the signal line and input terminals of the logarithmic amplifier.

2. Description of the Prior Art

An apparatus of the prior art to measure the logarithmic power of the nuclear reactors, critical assemblies and particle accelerators is generally shown in FIG. 1, in its construction.

In FIG. 1, 1 denotes nuclear radiation to be measured, 2 an ionization chamber for the nuclear radiation, 3 a signal cable including sheath and core conductor for transmitting output current of the ionization chamber, 4 a high voltage cable, 5 a high voltage power supply, 6 a logarithmic amplifier of current input type, which is usually referred to as Log-N amplifier, 7 a logarithmic output terminal and 8 a signal line of the core conductor of the signal cable. The output signal from the logarithmic output terminal is connected to a recorder or a meter to indicate the logarithmic output and also the output signal is connected to a period amplifier to be used for measuring the reactor period.

FIG. 2 shows an electrically equivalent circuit of the construction of the circuit shown in FIG. 1. A constant-current supply 11 is a power source that generates ionization chamber current I. An electrostatic capacitor 12 between electrodes of the ionization chamber, whose capacitance being represented by $C_d$, and an electrostatic capacitor 13 of the signal line to ground, whose capacitance being represented by $C_c$, are connected in parallel to the input circuit of logarithmic amplifier 6 and the sum of $C_d$ and $C_c$ is hereinafter referred to as an input capacitance $C_i$. Coaxial cables of about 30 m to 50 m length are frequently used as signal cable 8 so that the value of input capacitance $C_i$ grows sometimes around 3000 pF. The basic construction of logarithmic amplifier 6 of current input type includes a logarithmic diode 14, a negative feedback capacitor 15 that is used to maintain the operational stability of the circuit and an operational amplifier 16 of high input resistance type. Some silicon diodes are recently used as logarithmic diode 14 widely. An amplification gain A for the D.C. signal, hereinafter referred to as D.C. gain, of operational amplifier 16 is made sufficiently large as compared with unity, i.e. 1, and the phase compensation is made so that the gain reduces at a rate of $-20$ db/decade in high frequency region over a high-cut-off frequency $f_c$ and phase lag does not exceed 90°. Accordingly, a unity gain frequency $f_T$ of the operational amplifier is represented as follows:

$$f_T = A f_c.$$

The transfer function $G_0(S)$ of operational amplifier 16 is, therefore, represented by the following equation (1) as well known as the transfer function of the ordinary phase-compensated-operational-amplifier.

$$G_0(S) = (-A/1 + \tau s) \quad (1)$$

where $$\tau = \tfrac{1}{2} \pi f_c = A/2\pi f_T \quad (2)$$

S is a complex variable in Laplace transformation.

It is an indispensable condition to insert negative feedback capacitor 15 having more than a definite value in the logarithmic amplifier circuit of the prior art in order that no instability of response is appeared such as oscillation, ringing and overshoot etc. in the circuit. Therefore, since the capacitance $C_f$ of negative feedback capacitor 15 is not made so small because of stability condition that is mentioned above, the time constant of response becomes large and it has been impossible to obtain rapid response characteristics in a region of small input current. The relationship between a minimum feedback capacitance $C_{fmin}$ that is necessary for stabilizing the circuit of the prior art and the response time of the circuit is quantitatively shown in the following explanation.

When the ionization chamber current I becomes $I+i(t)$ after varying by $i(t)$ under a condition of $|i(t)| << |I|$, if it is assumed that i. the voltage variation at a connection point of signal line 8, logarithmic diode 14, feedback capacitor 15 and the input of operational amplifier 16 all shown in FIG. 2 is $e_1(t)$, ii. the voltage variation at the output of operational amplifier 16 or output terminal 7 is $e_2(t)$ and iii. the current flowing into the input of operational amplifier 16 is negligibly small, an equation (3) is established between the ionization chamber current variation $i(t)$ and the voltage variations $e_1(t)$ and $e_2(t)$.

$$C_i \frac{de_1(t)}{dt} + \frac{e_1(t) - e_2(t)}{r_d} + C_f \frac{d[e_1(t) - e_2(t)]}{dt} = i(t) \quad (3)$$

where $$C_i = C_d + C_c$$

$r_d$ is the dynamic resistance of logarithmic diode 14; the value of $r_d$ varies depending on the diode current $I_d$ which passes through the logarithmic diode.

The dynamic resistance $r_d$ is given by an equation (4) as is well known.

$$r_d = \frac{dV_d}{dI_d} \simeq \frac{kT}{q} \frac{1}{I_d} \simeq 2.6 \times 10^{-2} \text{ (volt)}/I \quad (4)$$

where $V_d$ is the diode voltage $$I_d = I + i(t) \simeq I.$$

k is the Boltzmann's constant,

T is temperature in °K. at the junction point of the logarithmic diode, and q is elementary charge of electron.

Accordingly, the dynamic resistance $r_d$ varies from 26 Ω to $2.6 \times 10^{10}$ Ω for the input current range of $10^{-3}$A to $10^{-12}$A.

If equation (3) is arranged with respect to $e_1(S)$ and $e_2(S)$ after the Laplace transformation, an equation (5) is obtained.

$$\left[(C_i + C_f)S + \frac{1}{r_d}\right]e_1(S) - \left[C_f S + \frac{1}{r_d}\right]e_2(S) = i(S) \quad (5)$$

The relationship between $e_1(S)$ and $e_2(S)$ can be expressed by means of the transfer function $G_o(S)$ of operational amplifier 16 which is given in equation (1), in an equation (6).

$$e_2(S) = G_o(S)e_1(S) \quad (6)$$

Therefore, $$e_1(S) = \frac{e_2(S)}{G_o(S)} = -$$

$$\frac{(1 + \tau s)}{A} e_2(S) = -\left[\frac{1}{A} + \frac{1}{2\pi f_T} S\right]e_2(S) \quad (7)$$

The relationship between $i(S)$ and $e_2(S)$ is obtained from equation (5) after $e_1(S)$ in equation (5) is substituted by $e_1(S)$ in equation (7) and, thereafter, the transfer function $G_1(S)$ as to the small current variation in the circuit shown in FIG. 2 is given in equation (8).

$$G_1(S) = \frac{e_2(S)}{i(S)} = \quad (8)$$

$$\frac{-Ar_d}{\frac{Ar_d(C_i + C_f)}{2\pi f_T} S^2 + \left\{[C_i + (1 + A)C_f]r_d + \frac{A}{2\pi f_T}\right\} S + (1 + A)}$$

When it is assumed that the small current variation $i(t)$ varies stepwise, the following response conditions are considered to be the response of the output from the circuit shown in FIG. 2.
(1) over damping,
(2) critical damping,
(3) overshoot,
(4) damped oscillation or ringing,
(5) continuous oscillation, etc.

Conditions (1) and (2) are distinguished as stable responses and condition (3) to (5) as unstable responses.

Besides, when stepwise signals are applied to a circuit having a transfer function $G(S)$ which is given by the form defined in an equation (9), as input to the circuit, $$G(S) = (C/S^2 + aS + b) \quad (9)$$

if $a > 0$ and $b > 0$ and $\quad (10)$ $a^2 - 4b \geq 0, \quad (11)$ it is well known that the response in the output of the circuit becomes an over damping or a critical damping, in other words, the damping factor exceeds 1 or is 1.

When equation (8) is compared with equation (9) and the values corresponding to the coefficients a, b and c are sought, it is realized that $a > 0$ and $b > 0$. The values of a and b thus obtained are substituted in equation (11) and the value of the dynamic resistance $r_d$ given in equation (4) is substituted in equation (8) and at the same time it is assumed that $(1 + A/A) \approx 1$ (because $A >> 1$) and $I = I_{max}$ (the maximum value of the input current I). Under these conditions, a conditional equation (12) is obtained.

$$f_T \geq I_{max}\left[C_f + 2C_i + 2\sqrt{C_i^2 + C_f C_i}\right] / \quad (12)$$

$$\left[2\pi \frac{kT}{q}\left(\frac{C_i}{A} + C_f\right)^2\right]$$

rdingly, equation (12) shows the relationship among the circuit constants which is necessary to obtain a stable step response having no overshoot nor ringing etc., in the logarithmic amplifying circuit of the prior art shown in FIG. 2.

Under the condition that
$I_{max} = 1$ mA
$C_i = 3000$ pF
$A = 10^2$, $10^3$ or $10^5$ the relationship that satisfies equation (3) between the minimum feedback capacitance $C_{fmin}$ and the unity gain frequency $f_T$ is shown in FIG. 3. It will be realized from the curves given in FIG. 3 that the minimum feedback capacitance needed $C_{fmin}$ is about 14700 pF with an operational amplifier having $f_T = 1$ MHz and $C_{fmin}$ is about 3300 pF with $f_T = 10$ MHz in order to obtain a stable response.

The time constant $T_O$ (63% value) of step response in the logarithmic amplifier of the prior art shown in FIG. 2 is nearly equal to a product of the dynamic resistance $r_d$ of the logarithmic diode and the capacitance $C_f$ of negative feedback capacitor 15 and, therefore, the following equation is obtained.

$$T_O \approx r_d C_f = 2.6 \times 10^{-2} C_f / I \quad (13)$$

The values of $C_{fmin}$, already obtained, are substituted for the $C_f$ in equation (13) and the relationship between the response characteristics and the input current is obtained as shown in FIG. 4 (a) and (b) under the condition that the unity gain frequency $f_T$ of the operational amplifier is 1 MHz and 10 MHz, respectively. The relationship shows that $T_O$ is about 3.8 sec with $f_T = 1$ MHz and $T_O$ is about 0.86 sec even with $f_T = 10$ MHz at a small input current I such as $10^{-10}$A. This means that an extremely slow response speed is merely obtained. Generally speaking since the limit of the unity gain frequency $f_T$ of an operational amplifier having high input resistance and with phase compensated, available under the present technique, is about 10 MHz, it can be said that the response characteristics given in FIG. 4 (b) is the boundary that can be obtained with a logarithmic measuring apparatus in the prior art.

As an explanation of the prior art, J. A. DE SHONG, JR. invented a method for improving the transient response over a wide range of input current by using a specially designed operational amplifier of which the forward gain phase shift never exceeds 45 degrees until the gain is reduced to unity or less and succeeded to reduce the response time of the logarithmic amplifier in a current range of low level. However, as can be seen from the explanation given in col. 6, lines 30 to 55 of the specification of U.S. Pat. No. 2,818,504 to J. A. DE SHONG, JR. and the frequency characteristics shown in FIG. 3 of DE SHONG, a response with completely no overshoot with respect to step inputs over the whole input current range cannot be obtained purely through the inventor's method. Therefore, in order to satisfy the condition of "no overshoot", it is necessary to reduce the closed loop phase shift by connecting a feedback capacitor in parallel diode 118 shown in FIG. 1 of DE SHONG, as similar to the prior art stated above and a defect is recognized with the invention in that ordinary phase-compensated-operational amplifiers of integrated circuits available in the market cannot be used because the forward gain phase shift up to 90 degrees is generally permissible in the ordinary operational amplifiers.

SUMMARY OF THE INVENTION

The object of the present invention is to improve, by a large margin, the limit of the response characteristics in the logarithmic amplifier that is restricted to an extremely low value in the logarithmic measuring apparatus in the prior art.

In the present invention, a resistor is inserted between a signal line for transmitting the ionization chamber current and a logarithmic amplifier and the resistance of the resistor is chosen at a certain value that exceeds a specific value of $A/10\pi C_i f_T$, said specified value being a value of the D.C. gain A of an operational amplifier to be used in the logarithmic amplifier which is divided by a product of a constant $10\pi$, an electrostatic capacity $C_i$ to ground existing in the signal line or in a signal source and a unit gain frequency $f_T$ of the operational amplifier but said certain value giving no degradation on the plateau characteristics of the ionization chamber. More particularly, if the resistance of the inserted resistor is chosen to be very large, the response time constant increases and, in addition, as the voltage to be applied to the ionization chamber becomes less due to the voltage drop across the inserted resistor, it is necessary to apply, in advance, a higher voltage to the chamber considering the voltage drop as well as the plateau characteristics of the ionization chamber.

It is made possible, due to the insertion of the above resistor, to make the capacitance of a negative feedback capacitor of the logarithmic amplifier zero or an extremely small value and, accordingly, the response time of the logarithmic amplifier can remarkably be made short in a region of small input current, in the present invention.

BRIEF DESCRIPTION OF THE DRAWING

FIG. 1 is a schematic diagram showing the construction of a logarithmic measuring apparatus of the prior art, FIG. 2 is an electrical equivalent circuit of the apparatus shown in FIG. 1, FIG. 3 shows curves indicating the relationship in the circuit shown in FIG. 2 between the minimum capacitance $C_{fmin}$ of the negative feedback capacitor that is the minimum value to obtain a stable response and the unity gain frequency $f_T$ of the operational amplifier.

DESCRIPTION OF THE PREFERRED EMBODIMENT

Figure 5:
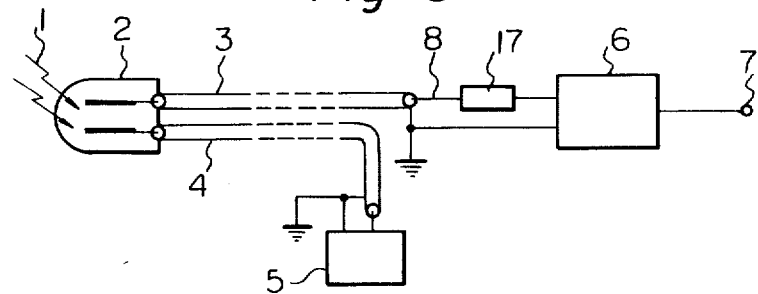
FIG. 5 is a schematic diagram showing the construction performing the method for shortening the response time of a logarithmic measuring apparatus of the present invention.
Figure 6:
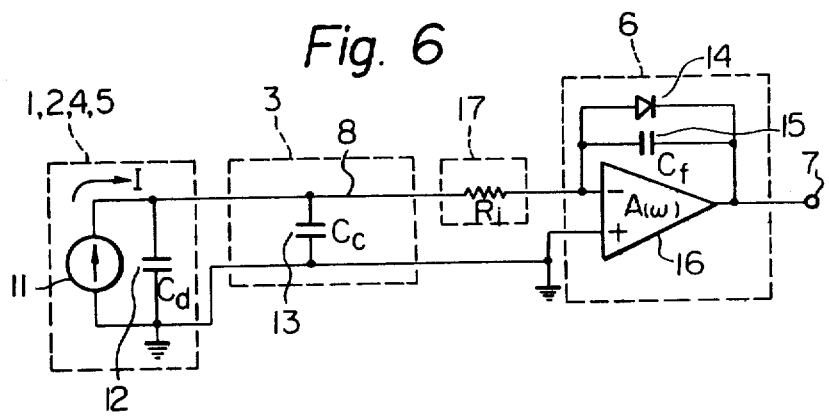
FIG. 6 is electrical equivalent circuit of the apparatus shown in FIG. 5.

The difference in construction of the logarithmic measuring apparatus between the present invention shown in FIGS. 5 and 6 and the prior art shown in FIGS. 1 and 2 is in that a resistor 17 of a specific resistance value $R_i$ is inserted between signal lines for transmitting the input current and the input terminal to logarithmic amplifier 6.

The condition to obtain stable step response is explained hereinafter. Now, in the equivalent circuit of the logarithmic measuring apparatus of subject invention shown in FIGS. 6, when the ionization chamber current I becomes I+i(t) after varying by i(t) under a condition of $|i(t)| << |I|$, if it is assumed that i. the voltage variation on signal line 8 caused by the input current variation i(t) is $e_0(t)$, ii. the voltage variation of the input voltage to operational amplifier 16, in other words, the voltage variation at a connection point of resistor 17, logarithmic diode 14 and the input of operational amplifier 16, is $e_1(t)$, iii. the voltage variation at output terminal 7 is $e_2(t)$ and iv. the feedback capacitance $C_f$ is equal to zero, equations (14) and (15) are established between the input current variation i(t) and the voltage variations $e_0(t)$, $e_1(t)$ and $e_2(t)$.

$$C_i \frac{de_0(t)}{dt} + \frac{e_0(t) - e_1(t)}{R_i} = i(t) \quad (14)$$

$$\frac{e_0(t) - e_1(t)}{R_i} - \frac{[e_1(t) - e_2(t)]}{r_d} = 0 \quad (15)$$

where $C_1 = C_d + C_c$ $r_d$ is the dynamic resistance of logarithmic diode 14 and the value of $r_d$ is given by equation (4).

If equations (14) and (15) are arranged with respect to $e_0(S)$, $e_1(S)$ and $e_2(S)$ after the Laplace transformation, equations (16) and (17) are obtained.

$$(C_i S + \frac{1}{R_i}) e_0(S) - \frac{1}{R_i} e_1(S) = i(S) \quad (16)$$

$$\frac{1}{R_i} e_0(S) - (\frac{1}{R_i} + \frac{1}{r_d}) e_1(S) + \frac{1}{r_d} e_2(S) = 0 \quad (17)$$

The relationship between $e_1(S)$ and $e_2(S)$ can similarly expressed by means of the transfer function $G_0(S)$ of operational amplifier 16, to equation (7) and an equation (18) is obtained.

$$e_1(S) = -\left(\frac{1}{A} + \frac{1}{2\pi f_T} S\right) e_2(s) \tag{18}$$

The transfer function $G_2(S)$ of the circuit of subject invention with the small current variation is given in an equation (19) by obtaining the relationship between $i(S)$ and $e_2(S)$ by solving the simultaneous equations consisting of (16), (17) and (18).

$$G_2(S) = \frac{e_2(S)}{i(S)} = \frac{-Ar_d}{\frac{AC_i(R_i + r_d)}{2\pi f_T} S^2 + \left[(1+A)C_iR_i + C_ir_d + \frac{A}{2\pi f_T}\right] S + (1+A)} \tag{19}$$

The condition for obtaining the stable response of the circuit of subject invention is given by an equation (20) by using equations (9) to (11) and (19) as the same manner as the condition for obtaining the stable response of the circuit of the prior art shown in FIG. 2, in other words, the condition for obtaining critical damping or over damping, is sought.

$$R_i \geq \frac{A}{1+A} \frac{1}{2\pi f_T C_i} - \frac{r_d}{1+A} + \frac{2A}{1+A}\sqrt{\frac{r_d}{2\pi f_T C_i}} \tag{20}$$

The dynamic resistance $r_d$ in the right side of equation (2) varies depending on the input current I as shown in equation (4). The maximum value of the right side of equation (20) is $A/2\pi f_T C_i$ when the dynamic resistance $r_d$ varies from 0 to infinity and, accordingly, the condition for obtaining the stable response of subject invention is given by an equation (21), irrespective of the magnitude of the input I and even when $C_f = 0$.

$$R_i \leq A/2\pi f_T C_i \tag{21}$$

It is, therefore, proved that the stable response can be obtained in the logarithmic measuring apparatus even without using of negative feedback capacitor 15 or even making the capacitance $C_f$ equal to zero, when resistor 17 is assigned the resistance value $R_i$ that satisfies equation (21).

In case that the both sides of equation (21) are equal the resistance value of resistor 17 is referred to as $R_{i0}$, the resistance value $R_{i0}$ is considered to be the minimum to be inserted as resistor 17 with $C_f = 0$.

It will be noted that the resistance value $R_{i0}$ is 5.3KΩ with either $C_i = 3000$ pF, $f_t = 1$ MHz and $A = 10^2$ or $C_i = 3000$ pF, $f_T = 10$ MHz and $A = 10^3$.

Figure 7:
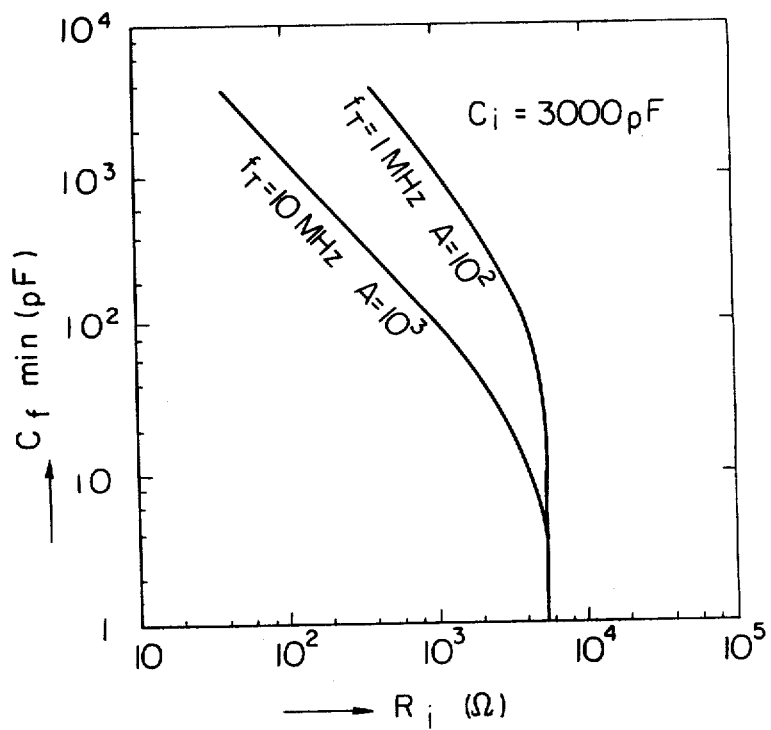
FIG. 7 shows curves indicating the relationship in the circuit of the present invention between the minimum capacitance $C_{fmin}$ of the negative feedback capacitor that is the minimum value to obtain a stable response and the specific resistance value $R_i$ of the resistor inserted between the signal line for transmitting the input current and the input terminal to the logarithmic amplifier.

The explanation stated above concerns the stable response condition with $C_f = 0$. It is further noted that a stable step response is obtained in the circuit of the present invention given in FIG. 6 with a resistance value of resistor 17 that is somewhat less than $R_{i0}$ when a negative feedback capacitor of some value is inserted. The relationship between the resistance value $R_i$ of resistor 17 that is made less than the resistance value $R_{i0}$ in abscissa and the minimum capacity $C_{fmin}$ of negative feedback capacitor 15 that is needed in order to obtain stable response in ordinate is shown in FIG. 7.

Response time $T_1$ (63% value) of the logarithmic measuring apparatus of the present invention is, as stated in the foregoing description, nearly given by equation (22) under the above stated stable response condition.

$$T_1 \approx C_iR_i + \left(\frac{C_i}{A} + C_f\right)\frac{2.6 \times 10^{-2}(\text{volt})}{I} \tag{22}$$

The response time $T_1$ (63% value) at the input current I from the ionization chamber are shown in FIG. 4(c) and FIG. 4(d) under the condition that $C_f = 0$ is satisfactory to the logarithmic amplifier when $R_i = R_{10} = 5.3$KΩ with $f_T = 1$ MHz and $A = 10^2$ and $f_T = 10$ MHz and $A = 10^3$, respectively, in equation (22), more particularly, FIG. 4(c) represents the case that an operational amplifier having a unity gain frequency $f_T$ of 1 MH was used and FIG. 4(d) represents the case that $f_T$ of 10 MH. It is noted that a series of small circles on FIG. 4(c) are the experimental values of time constants obtained with a logarithmic measuring apparatus composed of an input capacitance $C_i$ of 3000 pF, an input resistor Ri of 5.3KΩ, no feedback capacitor $C_f$ and an operational amplifier having unit gain frequency $f_T$ of 1 MHz and D.C. gain A of $10^2$. These experimental results were in good agreement with the theoretical values.

The time constants of response are, as can be seen from FIG. 4(c) and FIG. 4(d), 7.8 milliseconds and 800 microseconds with operational amplifiers of, respectively, $f_T = 1$ MHz and $f_T = 1$ MHz and $f_T = 10$ MHz, in case of the input current $I = 10^{-10}$A. These time constants are about one-five hundredth, for the former case, and about one-one thousandth, for the latter case, of that of the prior art in that the operational amplifier having the same value of the unity gain frequency $f_T$ is used. This shows that the response speed is remarkably improved by a large margin.

Figure 4:
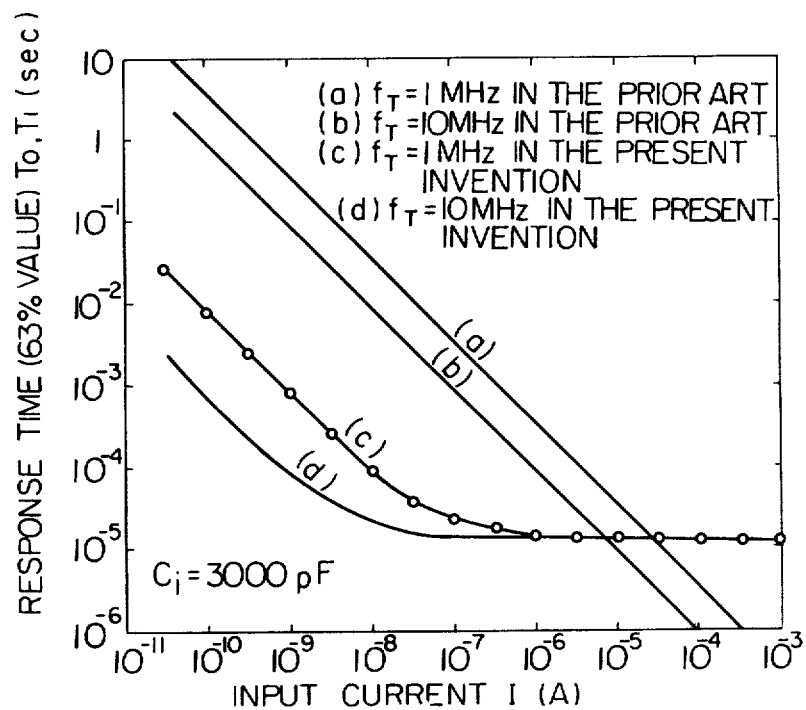
FIG. 4 shows curves indicating the relationship between the time constants $T_O$ and $T_I$ of response and the input current I, in which the curves (a) and (b) that are obtained in circuits of the prior art are compared with the curves (c) and (d) that are obtained in circuits of the present invention.

As can be seen from FIG. 4, the time constant of response becomes constant as the input current increases to some extent in the circuit construction of the present invention whereas the time constant of circuit in the prior art becomes extremely small beyond a necessary limit required for normal measurement when the input current is large to accordingly increase the equivalent bandwidth of noise. Therefore, it is a characteristic feature of the present invention that the increasing of the output noise in a large input-current range can be avoided without use of any additional filters.

The effective range of the resistance value $R_i$ of resistor 17, which is the characteristic feature of constructing the circuit in the method for shortening response time of the logarithmic measuring apparatus of the present invention is hereinafter discussed. When the resistance value $R_i$ of resistor R17 is chosen equal to the resistance value $R_{iO}$ which equals to the right side of equation (21) or larger than the resistance value $R_{iO}$, stable response of the apparatus can be obtained without feedback capacitor 15, as stated above. If the resistance value $R_i$ is chosen very large value compared with the $R_{iO}$, however, the value in the right side of equation (22) becomes naturally large with the increment of the resistance value $R_i$, accordingly the response time constant increases. As the applied voltage to the ionization chamber becomes less due to the voltage drop $R_i I$ across resistor 17, it is necessary to apply, in advance, a higher voltage to the chamber considering the voltage drop $R_i I$ and the plateau characteristics of the ionization chamber. As stated above, from the view points of necessity to prevent increasing of the response time and limitation of the applied voltage to keep a good plateau characteristics of the chamber, the maximum resistance value that can be used as the resistance value $R_i$ is thus limited.

On the contrary, when the resistance value $R_i$ is decreased compared with $R_{iO}$, the capacitance $C_f$ of the feedback capacitor needed to keep stable response of the apparatus becomes large according to decreasing of the input resistance value $R_i$ so that the value of the third term in the right side of equation (22) becomes large and the time constant of response increases in a range where the input current I is small. Therefore, the substantial improvement of the response time of the apparatus cannot be expected when the resistance value $R_i$ is chosen to be so small such as substantially less than one fifth of the resistance value $R_{iO}$, in other words, $A/10\pi C_i f_T$.

Accordingly, the range of the input resistance value $R_i$ where the effect of the means for shortening response time of the logarithmic measuring apparatus of the present invention gives sufficiently full play, is to be said from a value exceeding about one fifth of the resistance value $R_{iO}$ to a value that does not give any degradation on the plateau characteristics of the ionization chamber.

The means for shortening response time of the logarithmic measuring apparatus can be used as logarithmic nuclear power transient measuring apparatus for pulsed reactors, pulsed critical assemblies such as LINAC-BOOSTERS and particle accelerators where high speed response is required, in addition to it, can be applied to the apparatus in order to measure extremely short nuclear reactor periods as a high speed period meter by connecting a differential amplifier to the output terminal of the logarithmic reactor power measuring apparatus.

We claim:

1. In a method for shortening the response time of a logarithmic measuring apparatus which comprises using an ionization chamber sensitive to the nuclear radiation for nuclear radiation to be measured, a signal line connected to said ionization chamber to transmit the output current of said ionization chamber and a logarithmic amplifier having a feedback capacitor and a logarithmic diode in the negative feedback circuit of an operational amplifier of said logarithmic amplifier and connected to said signal line to receive said output current as the input of said logarithmic amplifier; inserting a resistor between said signal line and said logarithmic amplifier characterized in that the resistance value of said resistor is selected within a range that exceeds $A/10\pi C_i f_T$ but does not give any degradation on the plateau characteristics of said ionization chamber, whereby the capacitance of said feedback capacitor can be made substantially small including zero as compared with a capacitance which is needed in case when said resistor is not provided so that the response time of said logarithmic measuring apparatus is rendered to be short and a stable transient response can be obtained; wherein, A is the D.C. gain of the operational amplifier to be used in said logarithmic amplifier, $C_i$ is the sum of the electrostatic capacitance $C_d$ between electrodes of said ionization chamber and the electrostatic capacitance $C_c$ to ground of said signal line, and $f_T$ is the unity gain frequency of said operational amplifier.

* * * * *